(12) United States Patent
Bushell et al.

(10) Patent No.: US 8,786,634 B2
(45) Date of Patent: Jul. 22, 2014

(54) ADAPTIVE USE OF WIRELESS DISPLAY

(75) Inventors: John Samuel Bushell, San Jose, CA (US); Nicholas Vincent King, San Jose, CA (US); Bob Bradley, San Jose, CA (US); John Stuart Harper, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 13/225,210

(22) Filed: Sep. 2, 2011

(65) Prior Publication Data

US 2012/0306921 A1 Dec. 6, 2012

Related U.S. Application Data

(60) Provisional application No. 61/493,451, filed on Jun. 4, 2011.

(51) Int. Cl.
*G09G 5/00* (2006.01)

(52) U.S. Cl.
USPC .......................................... 345/649; 345/634

(58) Field of Classification Search
USPC ................................................. 345/634, 649
See application file for complete search history.

(56) References Cited

U.S. PATENT DOCUMENTS

| | | | |
|---|---|---|---|
| 7,633,076 B2 | 12/2009 | Huppi et al. | |
| 7,809,830 B2 | 10/2010 | Denoual | |
| 7,826,537 B2 | 11/2010 | Zhang et al. | |
| 2002/0131072 A1 | 9/2002 | Jackson | |
| 2003/0016233 A1 | 1/2003 | Charpentier | |
| 2003/0027517 A1* | 2/2003 | Callway et al. | 455/3.01 |
| 2005/0289631 A1* | 12/2005 | Shoemake | 725/118 |
| 2006/0044289 A1 | 3/2006 | Yee | |
| 2006/0088105 A1 | 4/2006 | Shen et al. | |
| 2006/0164324 A1 | 7/2006 | Polivy | |
| 2007/0046562 A1 | 3/2007 | Polivy | |
| 2007/0046697 A1* | 3/2007 | Hussain | 345/649 |
| 2007/0085759 A1 | 4/2007 | Lee | |
| 2008/0205389 A1 | 8/2008 | Fang et al. | |
| 2008/0212682 A1 | 9/2008 | Kalva | |
| 2011/0084900 A1 | 4/2011 | Jacobsen et al. | |

FOREIGN PATENT DOCUMENTS

| | | |
|---|---|---|
| JP | 2006259358 | 9/2006 |
| KR | 1020050030238 | 3/2005 |
| KR | 1020110050482 | 5/2011 |

OTHER PUBLICATIONS

Stephan Kopf, Wolfgang Effelsberg, "Mobile Cinema—Canonical Processes for Video Adaptation", Dec. 2008, pp. 369-375.
European Search Report for EP Patent Application No. 12170310, dated Oct. 19, 2012, 10 pages.

* cited by examiner

*Primary Examiner* — Maurice L McDowell, Jr.
(74) *Attorney, Agent, or Firm* — Wong, Cabello, Lutsch, Rutherford & Brucculeri, LLP

(57) ABSTRACT

A graphic display module operating on a first device prepares graphic data to be displayed on a wirelessly connected display adapter that includes graphics processing capability. The display adapter transmits metadata to the graphic display module that includes the graphic processing capabilities of the display adapter. The graphic display module uses the metadata, and possibly the available bandwidth, to selectively delegate graphic processing tasks to the display adapter.

16 Claims, 4 Drawing Sheets

ADAPTIVE USE OF WIRELESS DISPLAY

CROSS REFERENCE TO RELATED APPLICATIONS

This application claims the benefit pursuant to 35 U.S.C. 119(e) of U.S. Provisional Application No. 61/493,451, filed Jun. 4, 2011, which application is specifically incorporated herein, in its entirety, by reference.

BACKGROUND

1. Field

Embodiments of the invention relate to the field of manipulating data for presentation by a computer prior to use with a specific display system; and more specifically, to using more than one graphics processor to manipulate the data.

2. Background

Electronic devices such as personal computers, digital assistants, media players, wireless communication devices, and the like typically include a visual display unit to provide visual displays to a user. The visual displays are typically generated by application programs being executed by a processing unit included in the electronic device. Several application programs may be executed concurrently and they may share the visual display unit by using only portions of the display unit to present their visual displays and/or by "stacking" their visual displays so that the user can bring the display for any of the applications to the top of the stack to be viewed in its entirety.

The electronic device will typically include an operating system, which is a program executed by the processing unit, to provide an abstract interface to the hardware of the electronic device for the application programs. This allows specific programming requirements of the hardware to be encapsulated in the operating system and make the application programs independent of the specific hardware implementation. The operating system also manages the sharing of the hardware by the multiple applications.

The operating system will typically include support for providing visual displays on visual display units. The provided visual display support may include facilities for merging or compositing graphic elements to create a display layer and manipulating one or more display layers to create a visual display using a hierarchical layer abstraction. Supported graphic manipulations may include rotating, moving, and resizing graphic elements. Support may also be provided for adjusting the color and transparency of graphic elements. Animation of any or all of these supported transformations may also be provided.

It will be appreciated that supporting these graphic manipulations can be computationally intensive, particularly for high resolution displays. The electronic device may support multiple displays, which further increase the computational requirements. For example, an electronic device may include a first display that is included in the electronic device and an interface that allows a second display to be connected to the electronic device to provide additional space for visual displays.

It would be desirable to provide a computational architecture that supports extensive graphic manipulations for visual displays on multiple visual display units.

SUMMARY

A graphic display module operating on a first device prepares graphic data to be displayed on a wirelessly connected display adapter that includes graphics processing capability. The display adapter transmits metadata to the graphic display module that includes the graphic processing capabilities of the display adapter. The graphic display module uses the metadata, and possibly the available bandwidth, to selectively delegate graphic processing tasks to the display adapter.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
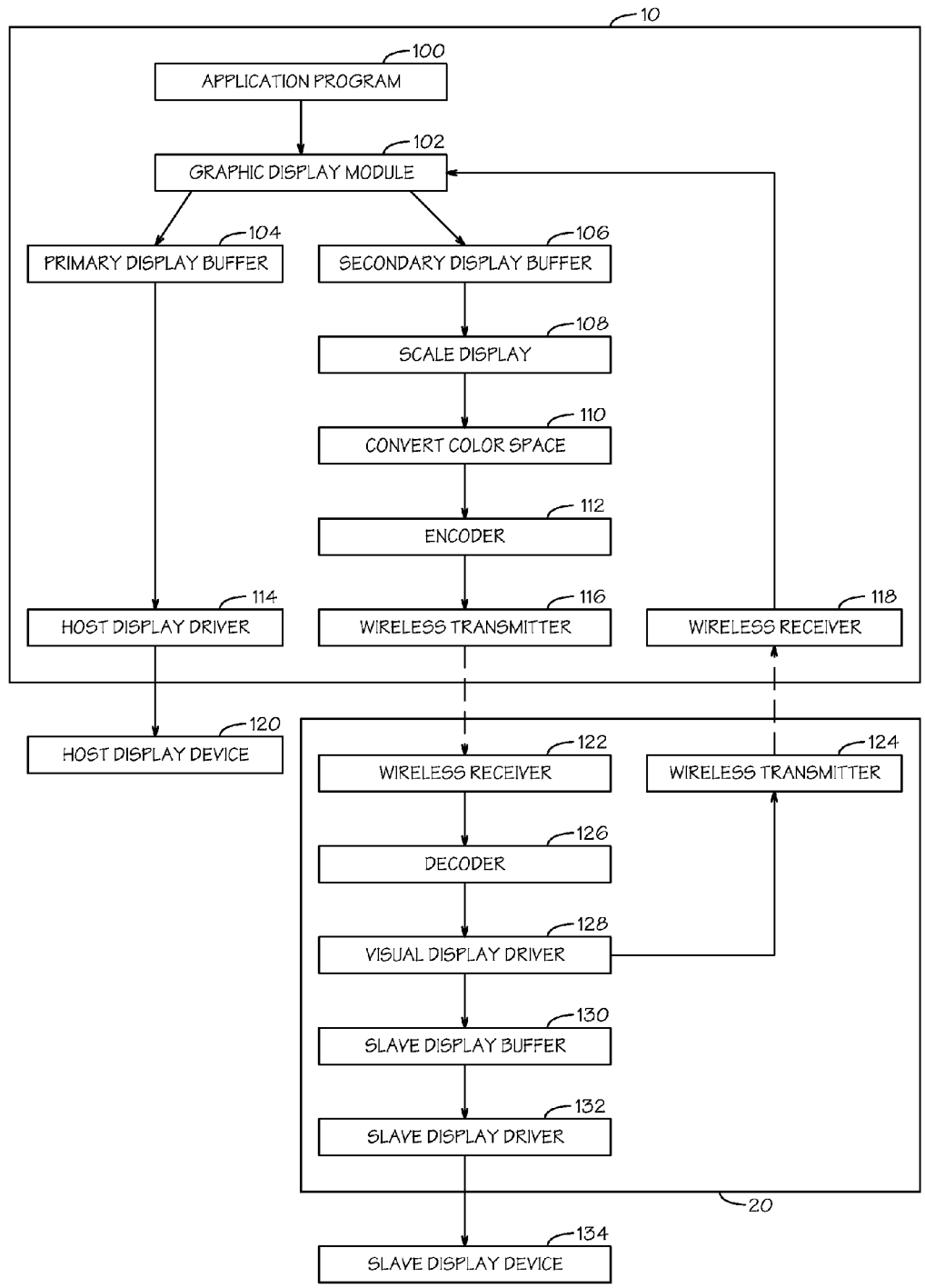
FIG. 1 is a block diagram of a host device and a slave device that embody the invention.

FIG. 1 shows a block diagram of a host device 10 and a slave device 20 that embody the invention. An application program 100 is executed by a processing unit on the host device 10. The application program 100 generates a visual display by communicating graphics commands to a graphic display module of 102 that is also executed by the processing unit on the host device 10.

The graphic display module 102 assembles graphic data in buffers 104, 106 to create a visual display on visual display devices 120, 134. In the implementation illustrated, a primary display buffer 104 is used to create a visual display that is local to the host device 10. The host display driver on 114 communicates the graphic data from the primary display buffer 104 to the host display device 120.

A secondary display buffer 106 is used to create a visual display on a slave display device 134 that is driven by a slave device 20 that receives graphic data from the host device 10 over a wireless communications link. On the host device 10 the secondary display buffer 106 may be scaled 108 to produce a display of an appropriate size for the slave display device 134. The image data may be encoded 112 to compress the data that is transmitted to the slave device 20. The encoding may require a color space conversion 110 prior to encoding. The graphic data is transmitted by a wireless transmitter 116 on the host device 10.

Processes for displaying graphic content are described in pending U.S. Provisional Patent Application No. 61/431,776, which is assigned to the assignee of the present application, and which is incorporated herein, in its entirety by reference.

The slave device 20 receives the graphic data on a wireless receiver 122. If the data has been encoded use them decoded 126 by the slave device 20. A visual display driver 128 receives the graphic data and assembles it in a slave display buffer 130. A slave display driver 132 communicates the graphic data from the slave display buffer 130 to the slave display device 134. The slave display device may be a part of the slave device or it may be a separate device that is coupled to a slave device.

The slave device 20 includes a wireless transmitter 124. The visual display driver 128 on the slave device 20 transmits metadata to a wireless receiver 118 on the host device 10. The metadata includes information about the graphic processing capabilities of the slave device 20. The metadata may also include information about the slave display device 134 including the orientation of the display device. Methods and devices for detecting the orientation of portable electronic devices with displays are described in issued U.S. Pat. No. 7,633,076, which is assigned to the assignee of the present application, and which is incorporated herein, in its entirety by reference.

The host device 10 includes a wireless receiver 118 that receives the metadata transmitted by the slave device 20. The graphic display module 102 uses the received metadata to adapt the preparation of the graphic data transmitted to the slave device 20.

Figure 2:
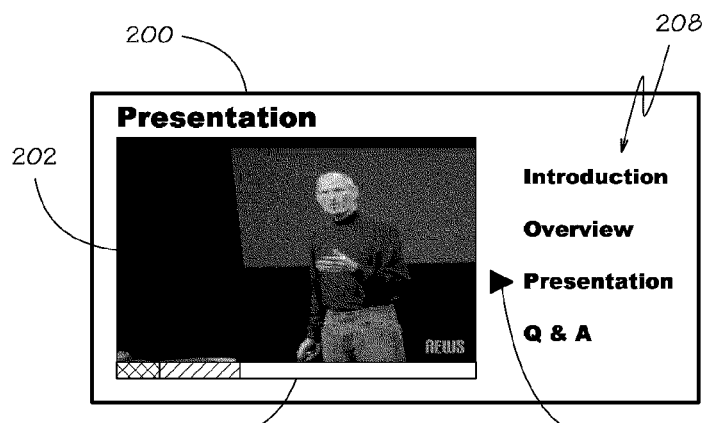
FIG. 2 is a visual display that may be produced by an embodiment of the invention.

FIG. 2 shows a visual display 200 that may be created by the graphic display module 102 for display on the slave display device 134. The visual display 200 illustrated includes several graphic elements including a moving video image 202, a progress bar 204, text elements 208, and a cursor 206 indicating a selection.

Figure 3:
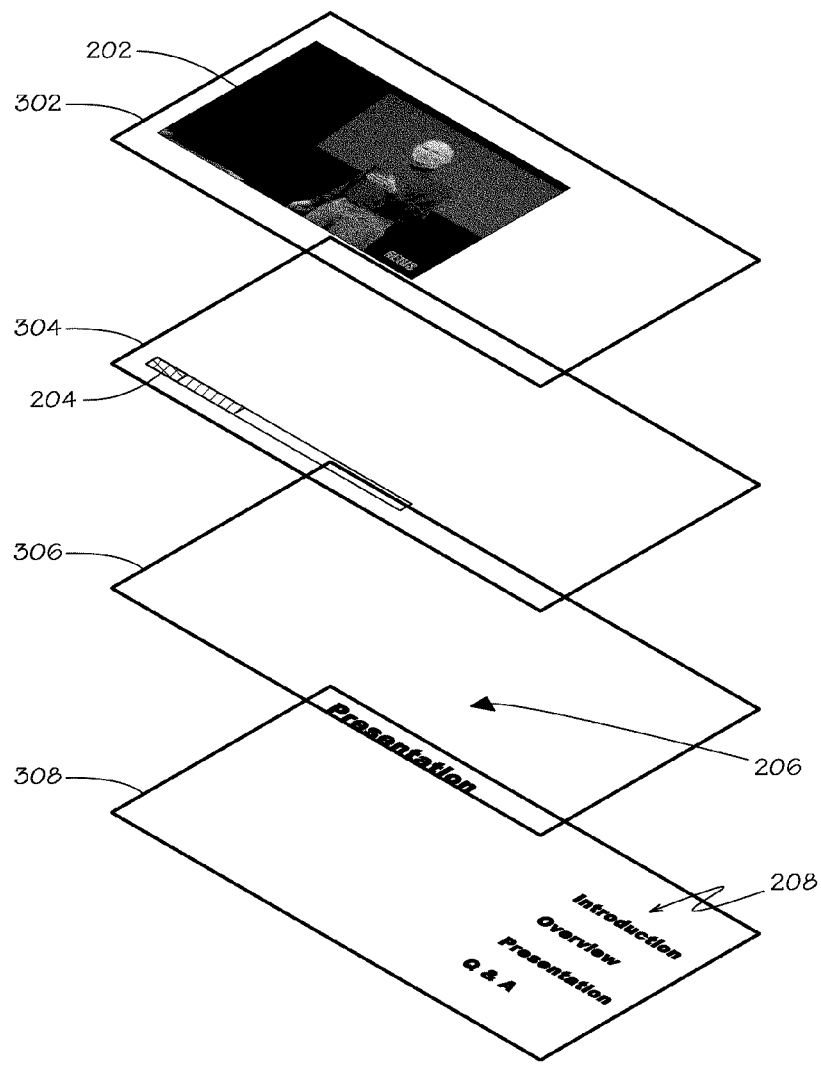
FIG. 3 is a conceptual representation of a method for producing the visual display of FIG. 2.

FIG. 3 is a pictorial representation of the hierarchal abstraction that the graphic display module 102 may present to the application program 100 for creating the visual display 200. The visual display may be created as a number of layers that are superimposed upon one another. In the example illustrated the text elements 208 may be created on a bottom layer 308. The cursor 206 may be placed on a layer 306 above the text elements. The progress bar 204 may be on a layer 304 above the cursor. The video image 202 may be on a top layer 302. The graphic display module 102 uses the metadata received from the slave device 20 to create metadata that is associated with the graphic data to delegate some or all of the manipulations of the graphic data to the visual display driver 128 on the slave device 20.

Figure 4:
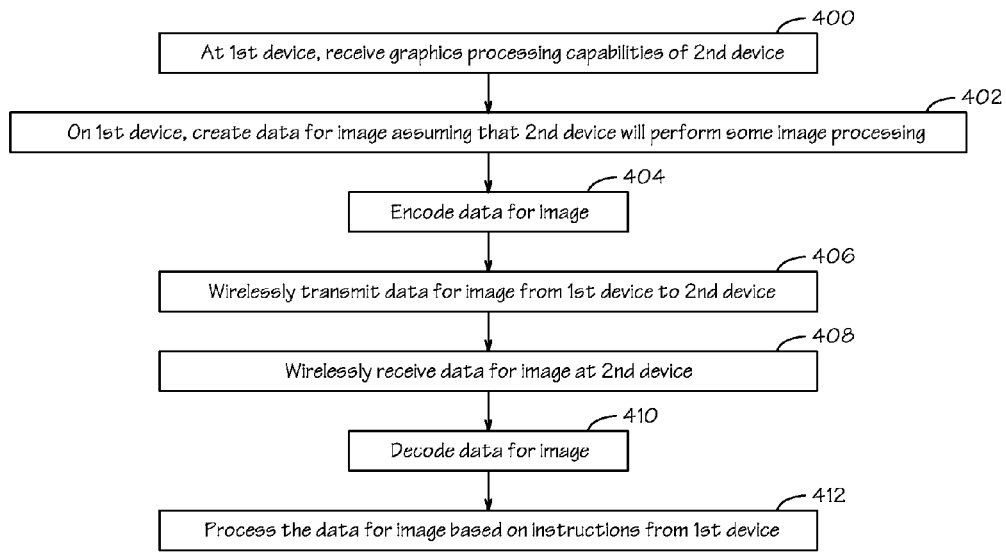
FIG. 4 is a flow chart for a method of producing a visual display on a slave device.

FIG. 4 is a flow chart for a process of delegating manipulations of the graphic data to the slave device 20. The graphics processing capabilities of the slave (second) device are received at the host (first) device 400. The host device creates data for an image assuming that the slave device will perform some image processing 402. In some implementations, the data for the image is encoded 404. The data for the image is wirelessly transmitted from the host device to the second device 406. The data for the image is wirelessly received at the second device 408. If the data was encoded, the slave device decodes the image data 410. The slave device processes the data for the image based on instructions from the host device 412.

Figure 5:
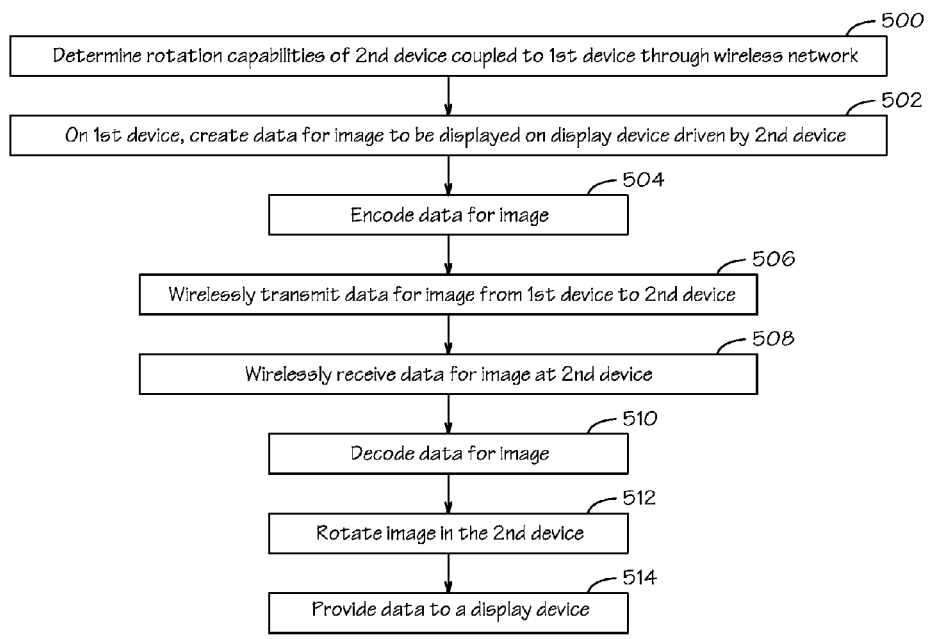
FIG. 5 is a flow chart or in a third of rotating a visual display on a slave device.

FIG. 5 is a flow chart for a process of rotating the graphic data in the slave device 20. The orientation status of the slave display is continuously determined for determining the appropriate orientation of the display on the slave device. The orientation of the slave display and the graphics rotation capabilities of the slave (second) device are received at the host (first) device 500. The host device creates data for an image assuming that the slave device will perform any necessary rotations 502. In some implementations, the data for the image is encoded 504. The data for the image is wirelessly transmitted from the host device to the second device 506. The data for the image is wirelessly received at the second device 508. If the data was encoded, the slave device decodes the image data 510. The slave device rotates the data for the image based on instructions from the host device 512. The rotated data is provided to the slave display device with an appropriate rotation for the display orientation 514.

Figure 6:
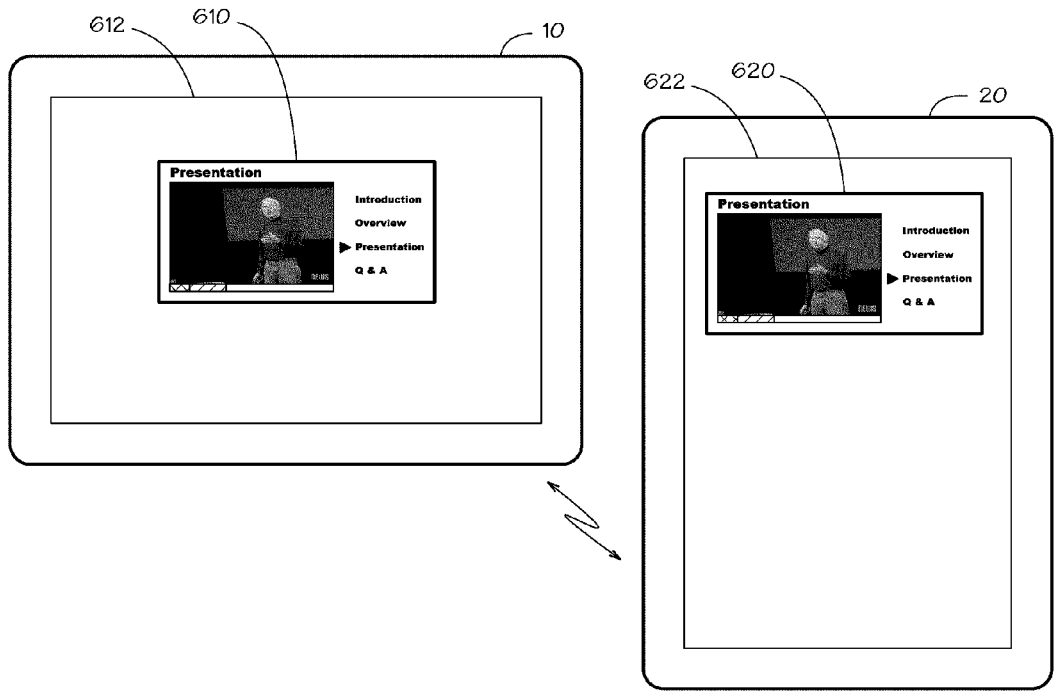
FIG. 6 is an illustration of a rotated visual display on a slave device.

FIG. 6 shows a host device 10 and a slave device 20 in wireless communication. As suggested by the illustration the host device and a slave device may have identical capabilities. The host device 10 includes a host display device 612 showing a visual display 610. It will be appreciated that the local visual display 610 is illustrated only to aid in the understanding of the operation of the invention and that it is not necessary that a visual display be displayed on the host device for the purposes of the invention. The slave device 20 new shown with a slave display device 622 showing a visual display 620. The host display device 612 is shown in a landscape orientation while the slave device 622 is shown in a portrait orientation.

Figure 7:
FIG. 7 is an image frame for producing a rotated visual display on a slave device.

Display devices typically have a single native orientation. When the display device is viewed in other than its native orientation it is necessary to rotate the visual display so that the display device appears to have an appropriate orientation other than its native orientation. If the native orientation of the slave display 622 is a landscape orientation and the display is viewed with the native top edge to the left as suggested in FIG. 6, then the visual display 620 will need to be rotated 90° clockwise as shown in FIG. 7. In one implementation the visual display 620 is fully composited by the host device and tagged with metadata to direct the slave device to rotate the visual display to correspond to the orientation of the slave display device 622.

Figure 8:
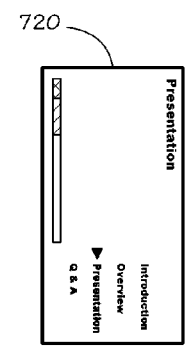
FIG. 8 is a partial image frame for producing a rotated visual display on a slave device.
Figure 9:
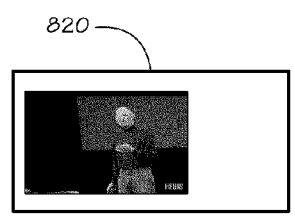
FIG. 9 is another partial image frame for producing a rotated visual display on a slave device.

FIGS. 8 and 9 illustrate an implementation where the visual display is provided to the slave device 20 as two image frames. The first image frame 720 shown in FIG. 8 is composited and rotated by the host device 10. The second image frame 820 shown in FIG. 9 is not rotated. The host device 10 tags each of these image frames with metadata so that the second image frame 820 is rotated by the slave device 20 and then composited with the already rotated first image frame 720. The host device 10 may tag some image frames as being persistent so that unchanging frames are retained by the slave device for compositing with a stream of changing frames.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A device to produce graphics data which is capable of being displayed on a display device, the device comprising:
a processing unit;

a wireless communication port coupled to the processing unit;

a graphic display module that is executed by the processing unit, the graphic display module causing the processing unit to perform operations including— receiving information from a wirelessly connected display driver device, the information including graphic processing capabilities of the display driver device;

obtaining graphics data;

creating, based at least in part on the received graphics processing capabilities of the display driver device, instructions for processing the graphics data with the display driver device; and causing the wireless communication port to transmit, to the display driver device, graphics data and the instructions.

2. The device of claim 1, wherein the graphic display module causes the processing unit to perform operations further including receiving a request to display the manipulated graphics data on a visual display unit coupled to the display driver device.

3. The device of claim 1, wherein the information received from the display driver device further includes a rotational orientation of a visual display unit.

4. The device of claim 3, wherein the instructions transmitted to the display driver device further instruct the display driver device to manipulate the transmitted data using the graphic processing capabilities of the display driver device to provide a correct rotational orientation of the data for display on the visual display unit.

5. The device of claim 1, wherein the graphic display module causes the processing unit to perform operations further including receiving one or more graphic layer objects to create a visual display on a visual display unit coupled to the display driver device by manipulating the one or more graphic layer objects.

6. The device of claim 5, wherein the instructions transmitted to the display driver device are based at least in part on the one or more graphic layer objects and the information from the display driver device, and wherein the instructions further instruct the display driver device to perform at least a portion of the manipulations of the one or more graphic layer objects to create the visual display on the visual display unit coupled to the display driver device.

7. The device of claim 1, wherein the instructions transmitted to the display driver device are further based on an available bandwidth on the wireless communication port.

8. The device of claim 7, wherein the graphics data transmitted to the display driver device is compressed based at least in part on the available bandwidth on the wireless communication port and the graphic processing capabilities of the display driver device.

9. A method of producing graphic data capable of being displayed on a display device, the method comprising:

receiving information from a wirelessly connected display driver device, the information including graphic processing capabilities of the display driver device;

obtaining graphics data;

creating, based at least in part on the received graphic processing capabilities of the display driver device, instructions for processing the graphics data with the display driver device; and transmitting, to the display driver device, the graphics data and the instructions.

10. The method of claim 9, further comprising receiving a request to display the manipulated graphics data on a visual display unit coupled to the display driver device.

11. The method of claim 9, wherein the information received from the display driver device further includes a rotational orientation of a visual display unit.

12. The method of claim 11, wherein the instructions transmitted to the display driver device further instruct the display driver device to manipulate the transmitted data using the graphic processing capabilities of the display driver device to provide a correct rotational orientation of the data for display on the visual display unit.

13. The method of claim 9, further comprising receiving one or more graphic layer objects to create a visual display on a visual display unit coupled to the display driver device by manipulating the one or more graphic layer objects.

14. The method of claim 13, wherein the instructions transmitted to the display driver device are based at least in part on the one or more graphic layer objects and the information from the display driver device, and wherein the instructions further instruct the display driver device to perform at least a portion of the manipulations of the one or more graphic layer objects to create the visual display on the visual display unit coupled to the display driver device.

15. The method of claim 9, wherein the instructions transmitted to the display driver device are further based on an available bandwidth on the wireless communication port.

16. The method of claim 15, wherein the graphics data transmitted to the display driver device is compressed based at least in part on the available bandwidth on the wireless communication port and the graphic processing capabilities of the display driver device.

* * * * *